United States Patent
Takahashi (10) Patent No.: US 11,346,823 B2
(45) Date of Patent: May 31, 2022

(54) ANALYZER

(71) Applicant: Shimadzu Corporation, Kyoto (JP)

(72) Inventor: Kazunori Takahashi, Kyoto (JP)

(73) Assignee: Shimadzu Corporation, Kyoto (JP)

(*) Notice: Subject to any disclaimer, the term of this patent is extended or adjusted under 35 U.S.C. 154(b) by 48 days.

(21) Appl. No.: 16/885,981

(22) Filed: May 28, 2020

(65) Prior Publication Data

US 2021/0010982 A1 Jan. 14, 2021

(30) Foreign Application Priority Data

Jul. 11, 2019 (JP) .............................. JP2019-129255

(51) Int. Cl.
*G01N 30/34* (2006.01)

(52) U.S. Cl.
CPC ....... *G01N 30/34* (2013.01); *G01N 2030/345* (2013.01)

(58) Field of Classification Search
CPC ........ G01N 25/18; G01N 30/30; G01N 30/54; G01N 30/62; G01N 30/66; G01N 1/22; G01N 1/4022; G01N 2030/0095; G01N 2030/025; G01N 2030/3084; G01N 2030/8881; G01N 2030/8886; G01N 27/18; G01N 30/02; G01N 30/6043; G01N 30/6095; G01N 30/72; G01N 30/88; F27B 17/02; F27D 11/00; F27D 21/00; H01J 49/0472; H01J 49/40

See application file for complete search history.

(56) References Cited

U.S. PATENT DOCUMENTS

| | | | | |
|---|---|---|---|---|
| 4,413,185 A * | 11/1983 | Leveson | ................ | G01N 30/64 |
| | | | | 250/423 P |
| 6,004,514 A * | 12/1999 | Hikosaka | ............... | G01N 30/88 |
| | | | | 422/89 |
| 6,598,460 B2 * | 7/2003 | Muto | ..................... | G01N 30/54 |
| | | | | 95/82 |

(Continued)

FOREIGN PATENT DOCUMENTS

| | | | | |
|---|---|---|---|---|
| CN | 101655483 A * | 2/2010 | ............. | G01N 30/30 |
| JP | H05-3383 A | 1/1993 | | |

(Continued)

OTHER PUBLICATIONS

"Femtoampere Input Bias Current Electrometer Amplifier" Datasheet, http://www.analog.com/jp/products/amplifiers/operationalamplifiers/ada4530-1.html#product-overview (downloaded on Mar. 26, 2020, available at least as early as Apr. 23, 2019), submitted with a machine translation.

(Continued)

*Primary Examiner* — Nimeshkumar D Patel
*Assistant Examiner* — Gedeon M Kidanu
(74) *Attorney, Agent, or Firm* — Muir Patent Law, PLLC (57) ABSTRACT

An analyzer capable of suppressing the generation of noise in a current detection circuit is provided. On a board 61, a current detection circuit 60 for processing an output signal from a detector is mounted. The cover member 63 has a space 630 in which the current detection circuit 60 is accommodated. A gas is supplied from a gas source into the space 630. The cover member 63 is provided with an inlet port 633 for introducing the gas from the gas source into the space 630 and an outlet port 634 for discharging the gas in the space 630.

8 Claims, 11 Drawing Sheets

(56) References Cited

U.S. PATENT DOCUMENTS

| | | | | |
|---|---|---|---|---|
| 6,834,531 B2* | 12/2004 | Rust | ............ | F27D 11/00 |
| | | | | 95/82 |
| 10,612,957 B2* | 4/2020 | Kaufmann | ............ | G01F 15/14 |
| 2002/0043097 A1* | 4/2002 | Muto | ............ | G01N 30/02 |
| | | | | 422/89 |
| 2004/0055376 A1* | 3/2004 | Thompson | ............ | G01F 1/6845 |
| | | | | 73/204.22 |
| 2007/0000828 A1* | 1/2007 | Norman | ............ | G01N 30/72 |
| | | | | 138/44 |
| 2008/0163683 A1* | 7/2008 | Becke | ............ | G01F 5/00 |
| | | | | 73/431 |
| 2009/0121129 A1* | 5/2009 | Wang | ............ | H01J 49/40 |
| | | | | 250/287 |
| 2011/0259097 A1* | 10/2011 | Mais | ............ | G01F 1/6842 |
| | | | | 73/204.25 |
| 2013/0061684 A1* | 3/2013 | Frauenholz | ............ | G01F 15/12 |
| | | | | 73/861 |
| 2014/0060176 A1* | 3/2014 | Mais | ............ | G01F 1/6842 |
| | | | | 73/204.22 |
| 2014/0290491 A1* | 10/2014 | Kanai | ............ | G01N 30/6052 |
| | | | | 96/101 |
| 2015/0219532 A1* | 8/2015 | Aono | ............ | G01N 30/12 |
| | | | | 73/863.12 |
| 2016/0103105 A1* | 4/2016 | Nakama | ............ | G01N 25/18 |
| | | | | 73/23.4 |
| 2019/0369066 A1* | 12/2019 | Sawata | ............ | G01N 30/64 |
| 2020/0003738 A1* | 1/2020 | Schmittmann | ..... | G01N 30/6043 |
| 2020/0088696 A1* | 3/2020 | Nakama | ............ | G01N 30/12 |

FOREIGN PATENT DOCUMENTS

| | | | | |
|---|---|---|---|---|
| JP | 2004-241671 A | | 8/2004 | |
| JP | 6394499 B2 | * | 9/2018 | |
| JP | 2018-205079 A | | 12/2018 | |
| JP | 2018205079 A | * | 12/2018 | |
| WO | WO-2017154059 A1 | * | 9/2017 | ............ G01N 25/18 |

OTHER PUBLICATIONS

"ADA4530-1R-EBZ User Guide" http://www.analog.com/media/jp/technical-documentation/userguides/ADA4530-1R-EBZ_UG-865_jp.pdf (downloaded on Mar. 26, 2020, available at least as early as Apr. 23, 2019) submitted with a machine translation.

* cited by examiner

ANALYZER

CROSS-REFERENCE TO RELATED APPLICATIONS

This application claims priority under 35 U.S.C. § 119 to Japanese Patent Application No. 2019-129255 filed on Jul. 11, 2019, the entire disclosure of which is incorporated herein by reference in its entirety.

TECHNICAL FIELD

The present invention relates to an analyzer.

BACKGROUND OF THE INVENTION

An analyzer, such as, e.g., a gas chromatograph, is provided with a board on which an amplifier circuit for amplifying an output signal from a detector is mounted (see, for example, Patent Document 1 listed below). An operational amplifier included in the amplifier circuit is an analog component for processing an analog signal, and the analogy component may generate noise in the signal.

In particular, in a gas chromatograph or a liquid chromatograph for detecting an output signal from a detector with high sensitivity, noise greatly affects the analysis result. Therefore, it is preferable to suppress the generation of noise in the analog component as much as possible.

PRIOR ART DOCUMENT

Patent Document

Patent Document 1: Japanese Unexamined Patent Application Publication No. 2018-205079

SUMMARY OF THE INVENTION

Problems to be Solved by the Invention

A current detection circuit including an operational amplifier, an electric resistor, and a wiring pattern for electrically connecting them is susceptible to moisture and contamination. For example, when the weather or the installation condition changes, the humidity around the current detection circuit increases, causing an increased leakage current due to the moisture adhering to the board. In such a case, there is a fear that noise is generated due to the leakage current.

The present invention has been made in view of the aforementioned circumstances, and an object of the present invention is to provide an analyzer capable of suppressing the generation of noise in a current detection circuit.

Means for Solving the Problem

The first aspect of the present invention is directed to an analyzer equipped with a detector, a board, a cover member, and a gas source. The detector is configured to detect components in a sample. On the board, a current detection circuit for processing an output signal from the detector is mounted. In the cover member, a space in which the current detection circuit is accommodated is formed. The gas source is configured to supply gas to the space. In the cover member, an inlet port for introducing the gas from the gas source into the space and an outlet port for allowing the gas in the space to follow out are formed.

Effects of the Invention

According to the first aspect of the present invention, a gas from the gas source is supplied to the space in which the current detection circuit is accommodated. The gas is introduced into the space from the inlet port formed in the cover member, passes through the space, and is then flowed out from the outlet port formed in the cover member. As a result, the humidity in the space can be reduced, so that the generation of noise in the current detection circuit can be suppressed.

EMBODIMENTS FOR CARRYING OUT THE INVENTION

1. General Configuration of Gas Chromatograph

Figure 1:
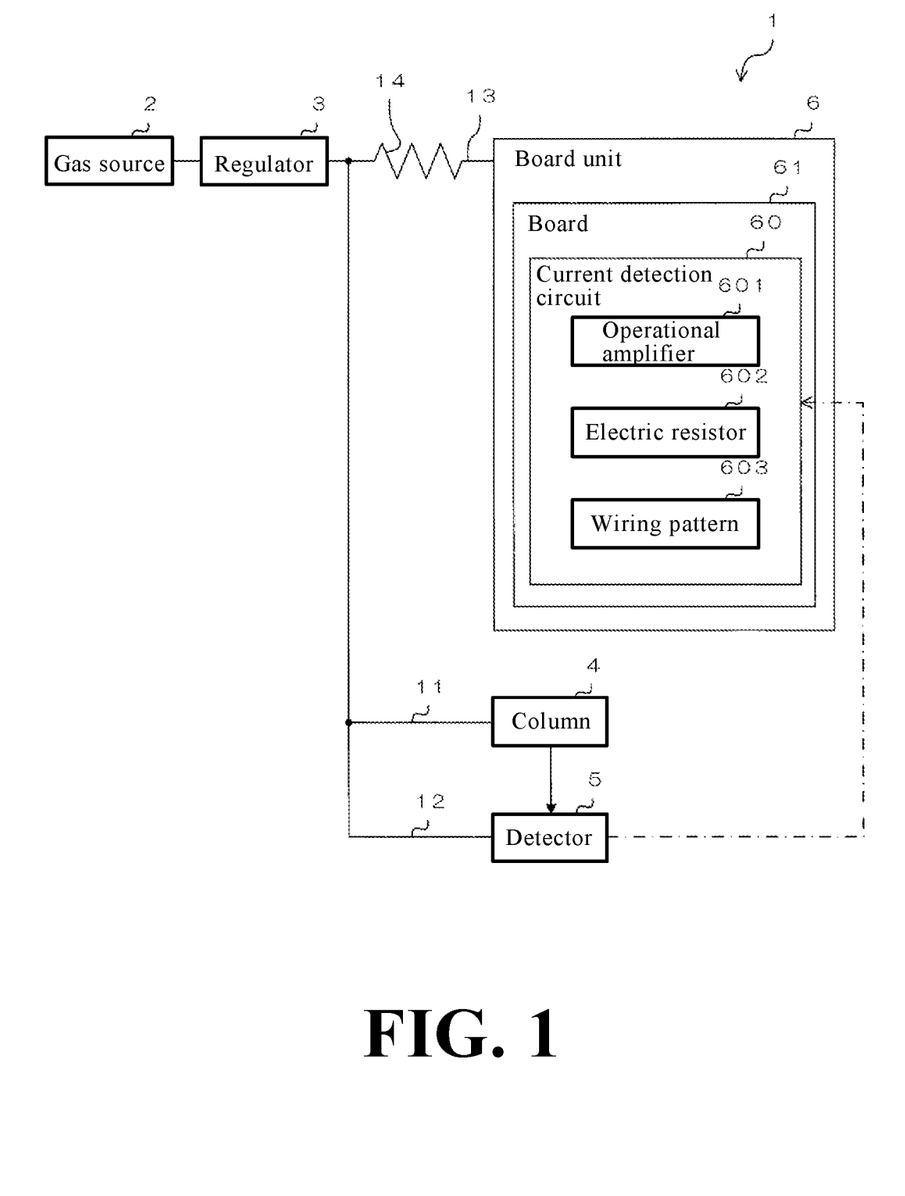
FIG. 1 is a block diagram showing an example of an entire configuration of a gas chromatograph.

FIG. 1 is a block diagram showing an example of an entire configuration of a gas chromatograph 1. The gas chromatograph 1 is provided with a gas source 2, a regulator 3, a column 4, a detector 5, a board unit 6, and the like.

The gas source 2 has a configuration including, e.g., a gas cylinder. The gas source 2 is configured to supply an inert gas, such as, e.g., a nitrogen gas and a helium gas. The regulator 3 controls the pressure of the gas supplied from the gas source 2 to be constant. In this embodiment, the gas supplied from the gas source 2 through the regulator 3 is introduced into the column 4, the detector 5, and the board unit 6.

The gas from the gas source 2 is supplied to the column 4 via the flow path 11. The gas supplied to the column 4 is a carrier gas which functions as a carrier fluid (mobile phase). A sample vaporization chamber (not shown) is interposed in the flow path 11, and a liquid sample injected into the sample vaporization chamber is vaporized, whereby the vaporized sample is introduced into the column 4 together with a carrier gas. The components in the sample are separated in the course of passing through the column 4, and the separated components are sequentially guided to the detector 5.

The gas from the gas source 2 is supplied to the detector 5 via the flow path 12. As the detector 5, for example, an FID (Flame Ionization Detector) can be used, but the present invention is not limited thereto. For example, by using a mass spectrometer as the detector 5, a gas chromatograph mass spectrometer can be configured.

The gas supplied to the detector 5 functions as a makeup gas to improve or stabilize the sensitivity in the detector 5. When a gas is being supplied to the column 4, a part of the gas is also supplied to the detector 5. However, it may be configured to supply a gas only to the detector 5 by providing a valve in the flow path of the gas and switching the valve.

The gas from the gas source 2 is supplied to the board unit 6 via a flow path 13. A fluid resistor 14 is interposed in the flow path 13, so that the gas from the gas source 2 is supplied to the board unit 6 after being reduced in pressure in the fluid resistor 14. The fluid resistor 14 may be formed of a resistive tube having an inner diameter smaller than that of the flow path 13 or may be formed of another member, such as, e.g., a valve and a flow controller.

A part of the gas supplied to the column 4 or a part of the gas supplied to the detector 5 is supplied to the board unit 6. That is, when a gas is supplied to the column 4 or the detector 5, a part of the gas is also supplied to the board unit 6. However, it may be configured such that a valve is provided in the flow path of the gas and is switched so that the gas is supplied only to the board unit 6. Further, it also may be configured such that the gas is supplied to the board unit 6 only for a predetermined period of time, for example, a period of time during which the detector 5 is detecting the gas by switching a valve at a predetermined timing. Alternatively, a small amount, e.g., a few mL/min, of a gas may be always supplied to the board unit 6 even when the analysis by the gas chromatograph 1 is not being performed.

The board unit 6 is provided with a board 61. The board 61 is an insulation rigid board formed of, for example, a glass epoxy board. A printed wiring is formed on the surface of the board 61 by printing a wiring pattern 603 using conductors. A part of the wiring pattern 603 on the board 61 and an operational amplifier 601 and an electric resistor 602 electrically connected to the wiring pattern 603 constitute a current detection circuit 60. As described above, the current detection circuit 60 is mounted on the board 61. However, the board 61 is not limited to a rigid board and may be another type of board such as, e.g., a flexible board.

An output signal from the detector 5 is input to the current detection circuit 60. The current detection circuit 60 is a circuit for processing the output signal from the detector 5 and may function as a charge-detecting circuit. In the current detection circuit 60, for example, the voltage across the electric resistor 602 through which the current from the detector 5 flows is amplified by the operational amplifier 601 and measured. The operational amplifier 601 is an analog component that processes analog signals. The operational amplifier 601 may have a configuration including, for example, an FET (Field-Effect Transistor).

2. First Embodiment

Figure 2A:
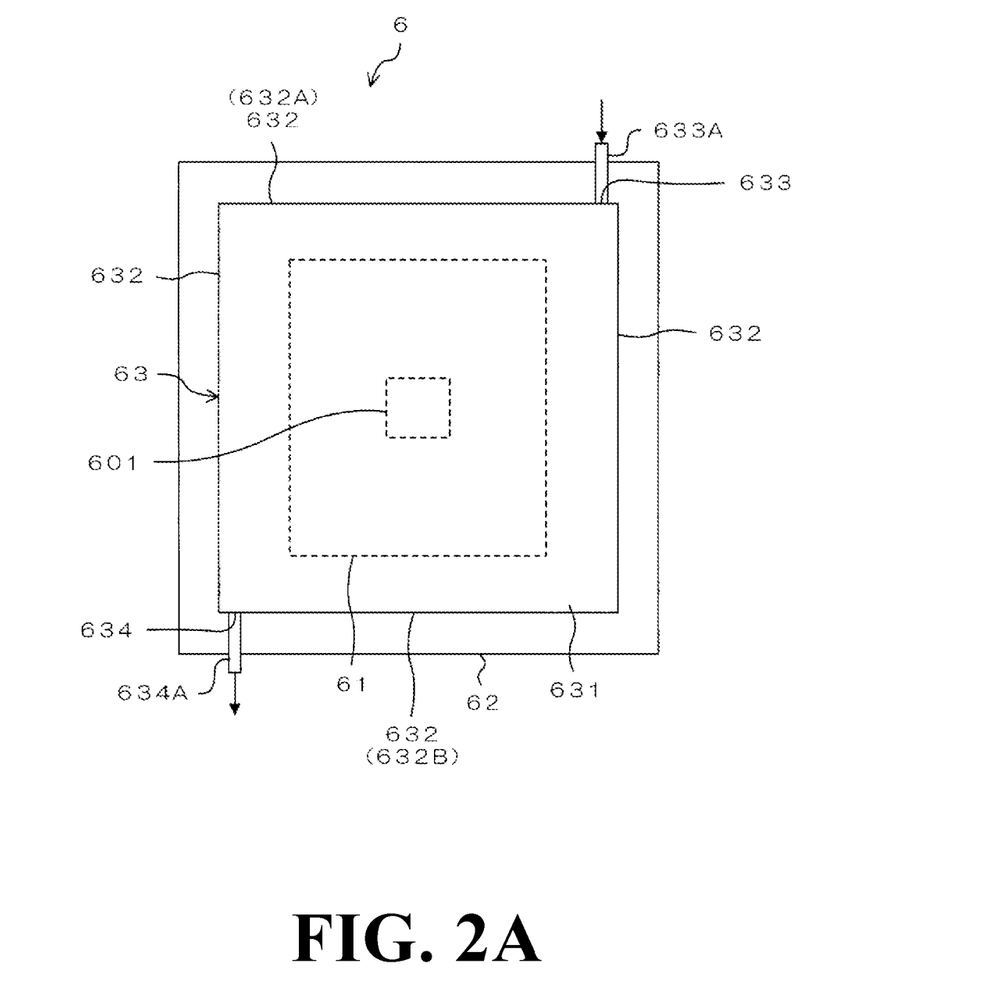
FIG. 2A is a diagram showing a configuration example of a board unit of a gas chromatograph according to a first embodiment and shows a plan view of the board unit.
Figure 2B:
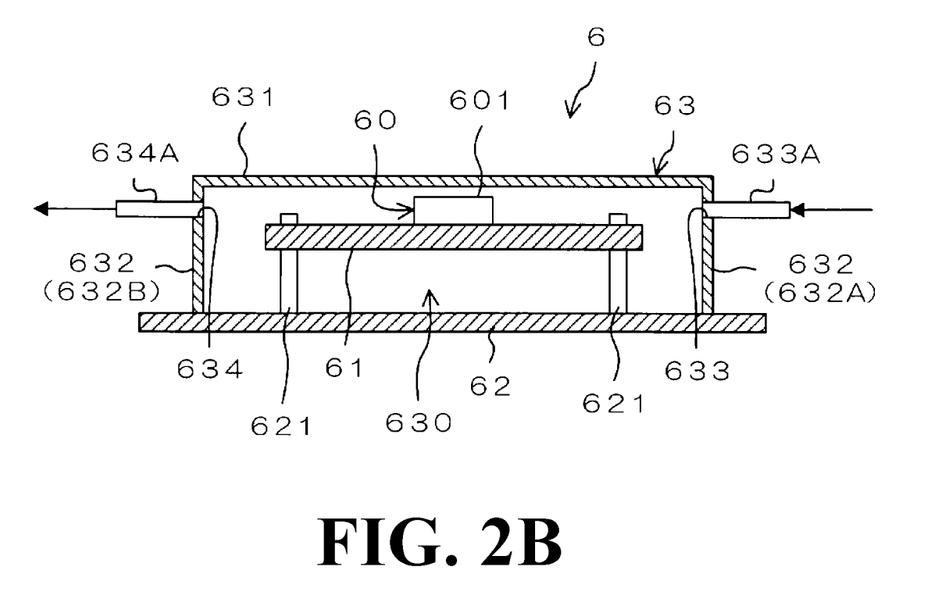
FIG. 2B is a diagram showing a configuration example of a board unit of a gas chromatograph according to a first embodiment and shows a cross-sectional view of the board unit.

FIG. 2A and FIG. 2B are diagrams showing a configuration example of the board unit 6 of a gas chromatograph according to a first embodiment. FIG. 2A shows a top view of a board unit 6 and FIG. 2B shows a cross-sectional view of the board unit 6.

In addition to the board 61 described above, the board unit 6 is provided with a base member 62 and a cover member 63. The base member 62 is a plate-like member made of metal, such as, e.g., aluminum and iron, or a resin. The base member 62 is preferably formed of a water-impermeable material, but is not limited to the above-described materials. The base member 62 may be formed of a part of the housing, etc., of the gas chromatograph 1.

The board 61 is held by the base member 62. Specifically, the board 61 is fixed to the fixing portions 621 provided so as to project from the base member 62. With this, the board 61 is held in a state in which the board is apart from the base member 62 by a distance. The base member 62 is formed in, for example, a flat plate shape, and the board 61 is held so as to be parallel to the base member 62. However, the board 61 may be held inclined with respect to the base member 62.

The cover member 63 is a hollow-shaped member for accommodating the board 61 in the space 630 formed therein. With this, the current detection circuit 60 mounted on the board 61 is accommodated in the space 630. The cover member 63 is configured by appropriately bending or bonding a plate-like member made of metal, such as, e.g., aluminum and iron. The cover member 63 is preferably made of a water-impermeable material, but is not limited to metal and may be made of other materials such as resin.

The cover member 63 includes a rectangular top plate 631 and four side plates 632 protruding in the same direction from the respective sides of the top plate 631. In a plan view as shown in FIG. 2A, the outer shape of the top plate 631 is larger than the outer shape of the board 61. The cover member 63 is attached to the base member 62 in a state in which the leading edge (bottom edge) of each side plate 632 is in contact with or in close proximity to the surface (top surface) of the base member 62. The board 61 is accommodated in the space 630 surrounded by the base member 62 and the cover member 63. The edge portions of the adjacent side plates 632 may be in contact with each other or may be arranged with a gap therebetween. Note that the shape of the cover member 63 is not limited to the shape as described above, and for example, the top plate 631 may be formed in a shape other than a rectangular shape.

An inlet port 633 and an outlet port 634 are formed in the cover member 63. One end portion of an inlet tube 633A is attached to the inlet port 633. A flow path 13 is communicated with the other end portion of the inlet tube 633A. One end portion of an output tube 634A is attached to the outlet port 634. The other end portion of the output tube 634A is open to the atmosphere.

With this configuration, the gas from the gas source 2 is introduced into the space 630 from the inlet port 633, and the gas in the space 630 is flowed out from the outlet port 634 to the atmosphere. That is, by introducing a gas into the space 630 from the inlet port 633, the inside of the space 630 is filled with the gas, and then by further introducing a gas into the space 630 from the inlet port 633, the gas in the space 630 overflows from the outlet port 634. Note that the output tube 634A may be omitted so that the gas may be directly flowed out from the outlet port 634. Alternatively, a pipe may be attached to the output tube 634A to direct the gas through the pipe to any space in the device or out of the device.

According to the above-described configuration, the inside of the space 630 becomes a positive pressure with respect to the atmospheric pressure. This makes it difficult for foreign substances or the like in the air to mix into the space 630, so that it is possible to prevent adverse effects due to the adherence of the foreign substances or the like to the board 61. The humidity in the space 630 into which the gas from the gas source 2 is supplied becomes, for example, 60% or less. The water content in the gas from the gas source 2 is, for example, 10.7 ppm or less. Note that these numerical values are mere examples, and other arbitrary values may be set.

Both the inlet port 633 and the outlet port 634 are formed in the side plate 632. Specifically, the inlet port 633 is formed in one side plate 632 (side plate 632A) of the pair of side plates 632 facing each other and the outlet port 634 is formed in the other side plate 632 (side plate 632B). In this example, the pair of the above-described side plates 632 face each other so as to extend in parallel with each other.

More specifically, the inlet port 633 is formed on one horizontal end of the side plate 632A, i.e., on the right side in FIG. 2A. On the other hand, the outlet port 634 is formed at the end of the other side in the horizontal direction (left side in FIG. 2A) in the side plate 632B. As described above, the inlet port 633 and the outlet port 634 are formed at respective corners on a horizontal direction diagonal line in the cover member 63. As a result, the gas introduced into the space 630 from the inlet port 633 can uniformly flow through the space 630 and can come into contact with the entire board 61 accommodated in the space 630.

Note that the inlet port 633 and the outlet port 634 are not always limited to be formed at the above-mentioned positions, and may be formed at any positions of the cover member 63. Further, the outlet port 634 is not limited to the configuration formed as a clear hole and may be configured by any gap such as a gap between the cover member 63 and the base member 62 in addition to the gap between the edge portions of the adjacent side plates 632, for example. The airtightness of the space 630 may be ensured by interposing a sealing member, such as, e.g., an elastic member, an adhesive material, and an adhesive material, in the gap between the cover member 63 and the base member 62.

As described above, in this embodiment, the space 630 is formed by attaching the cover member 63 to the base member 62, and the board 61 is accommodated in the space 630. As a result, the board 61 and the current detection circuit 60 mounted on the board 61 are covered with the cover member 63.

3. Second Embodiment

Figure 3A:
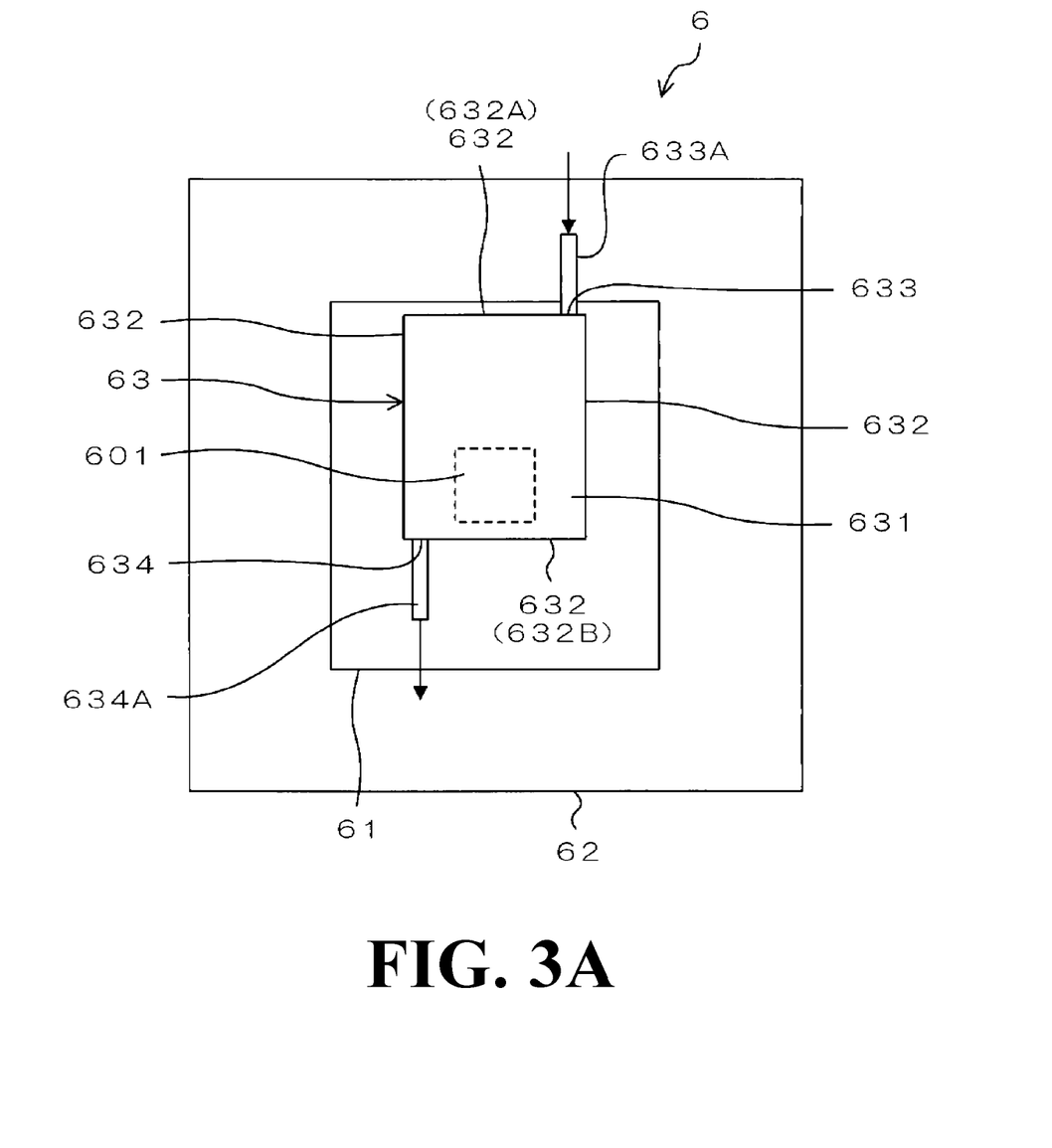
FIG. 3A is a diagram showing a configuration example of a board unit of a gas chromatograph according to a second embodiment and shows a plan view of the board unit.
Figure 3B:
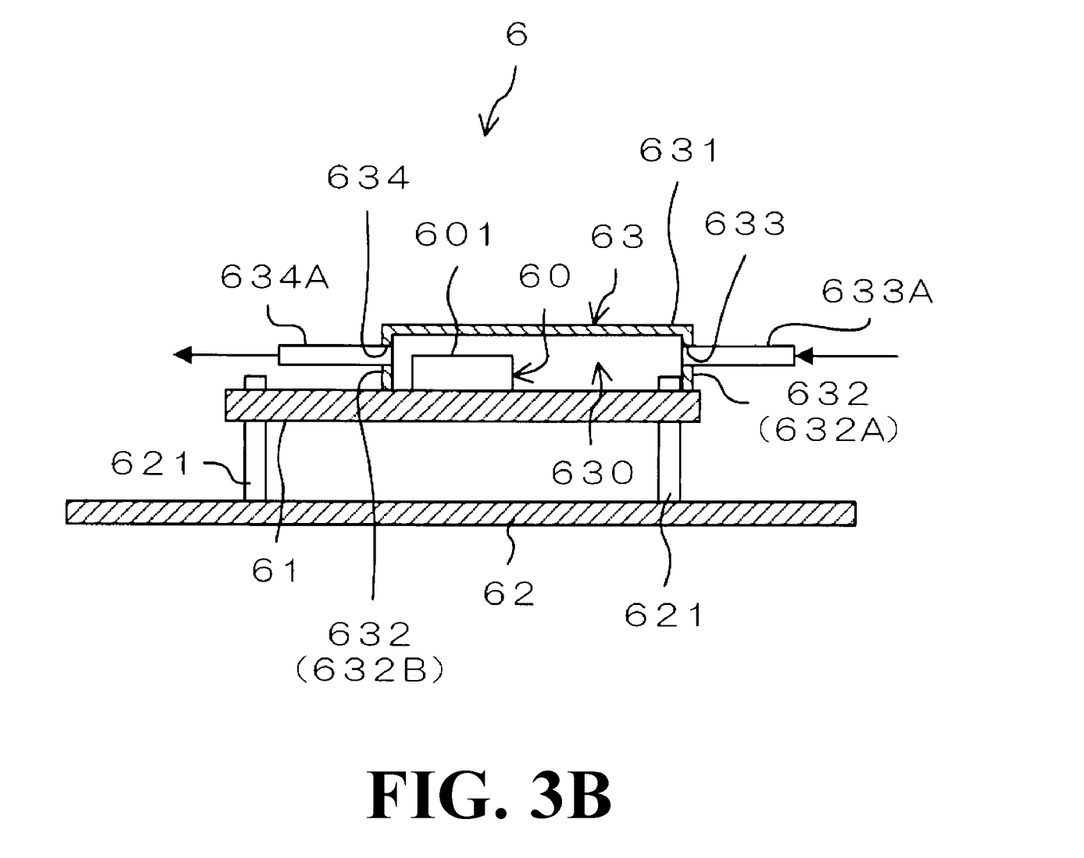
FIG. 3B is a diagram showing a configuration example of a board unit of a gas chromatograph according to a second embodiment and shows a cross-sectional view of the board unit.

FIG. 3A and FIG. 3B are diagrams showing a configuration example of the board unit 6 of the gas chromatograph according to a second embodiment. FIG. 3A shows a top view of the board unit 6 and FIG. 3B shows a cross-sectional view of the board unit 6. In this embodiment, only the shape and the mounting position of the cover member 63 differ from those of the first embodiment. Therefore, the same component as that of the first embodiment is denoted by the same reference numeral in the figures, and the detailed descriptions thereof are omitted.

The cover member 63 of this embodiment has a smaller internal volume than that of the cover member 63 of the first embodiment. Specifically, in the plan view as shown in FIG. 3A, the outer shape of the top plate 631 of the cover member 63 is smaller than the outer shape of the board 61. The cover member 63 covers only a part of the circuit on the board 61 by being attached to the board 61 rather than covering the entire board 61 as in the first embodiment. A part of the circuit covered by the cover member 63 includes a current detection circuit 60. Note that the cover member 63 may be configured to cover not only a part of the circuit on the board 61 but also the entire circuit.

In the same manner as in the first embodiment, the cover member 63 includes a rectangular top plate 631 and four side plates 632 protruding in the same direction from the respective sides of the top plate 631. The cover member 63 is attached to the board 61 in a state in which the leading edge (bottom edge) of each side plate 632 is in contact with or in close proximity to the surface (top surface) of the board 61. The current detection circuit 60 is accommodated in the space 630 surrounded by the board 61 and the cover member 63. The edge portions of the adjacent side plates 632 may be in contact with each other or may be arranged with a gap therebetween. Note that the shape of the cover member 63 is not always limited to be formed in the shape as described above, and for example, the top plate 631 may be formed in a shape other than a rectangular shape.

In the same manner as in the first embodiment, the inlet port 633 and the outlet port 634 are formed in the cover member 63. The inlet port 633 and the outlet port 634 are not always limited to be formed at the positions shown in FIG. 3A and FIG. 3B, but may be formed at any position of the cover member 63. Further, the outlet port 634 is not limited to the configuration formed as a clear hole, and may be configured by any gap such as a gap between the cover member 63 and the board 61 in addition to the gap between the edge portions of the adjacent side plates 632, for example.

As described above, in this embodiment, the space 630 is formed by attaching the cover member 63 to the board 61 and the current detection circuit 60 is accommodated in the space 630, so that the current detection circuit 60 is covered with the cover member 63.

4. Third Embodiment

Figure 4A:
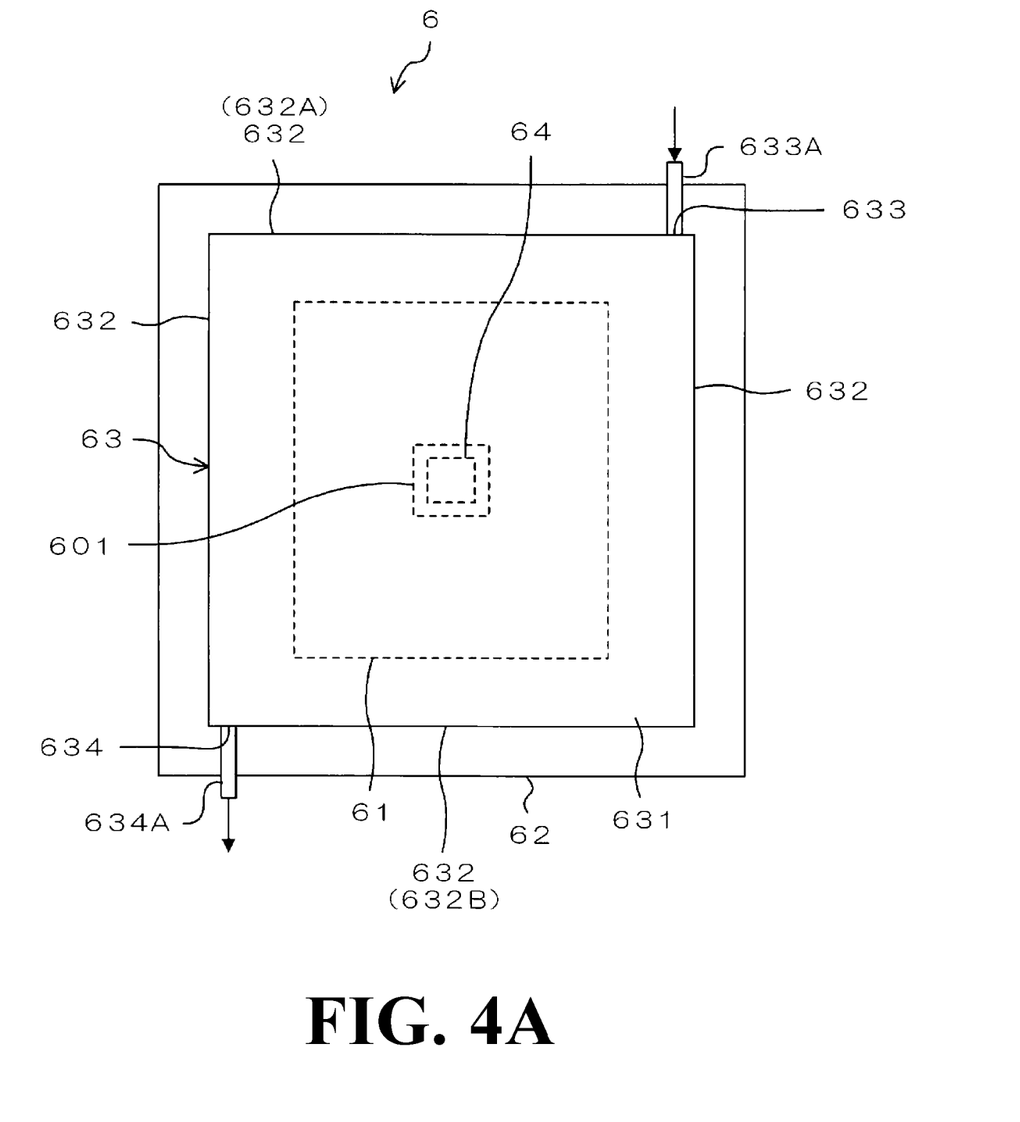
FIG. 4A is a diagram showing a configuration example of a board unit of a gas chromatograph according to a third embodiment and shows a plan view of the board unit.
Figure 4B:
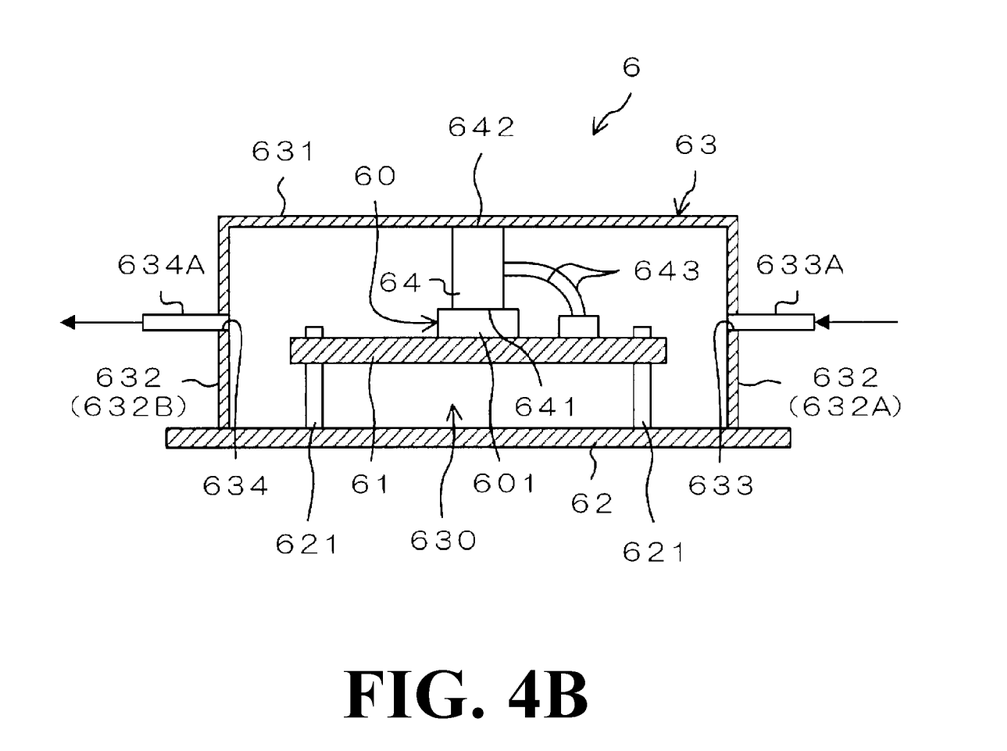
FIG. 4B is a diagram showing a configuration example of a board unit of a gas chromatograph according to a third embodiment and shows a cross-sectional view of the board unit.

FIG. 4A and FIG. 4B are diagrams showing a configuration example of a board unit 6 of a gas chromatograph according to a third embodiment. FIG. 4A shows a top view of a board unit 6 and FIG. 4B shows a cross-sectional view of the board unit 6. This embodiment differs from the first embodiment only in that the board unit 6 is provided with a Peltier element 64. Therefore, the same component as that of the first embodiment is denoted by the same reference numeral in the figures, and the detailed descriptions thereof are omitted.

In this embodiment, the Peltier element 64 is in contact with the surface of operational amplifier 601. Specifically, the first surface 641 of the Peltier element 64 is in contact with the surface of the operational amplifier 601 and the second surface 642 of the Peltier element 64 is in contact with the cover member 63. The Peltier element 64 is electrically connected to the board 61 via two wirings 643. A direct current is supplied from the board 61 to the Peltier element 64 through the wirings 643. Thereby, heat absorption is performed on the first surface 641 of the Peltier element 64, and heat generation is performed on the second surface 642. As a result, the heat of the operational amplifier 601 is transferred to the cover member 63, so that the operational amplifier 601 is cooled.

The Peltier element 64 may be energized at all times during the operation of the gas chromatograph 1 or may be energized for only a predetermined duration. The predetermined period may be set to any period, for example, a period during which a gas is supplied to the board unit 6 or a period during which the gas is being detected by the detector 5.

In this example, the second surface 642 of the Peltier element 64 is in contact with the top plate 631 of the cover member 63 but may be in contact with another portion such as the side plate 632. The first surface 641 of the Peltier element 64 is not always limited to be in contact with the operational amplifier 601 and may be in contact with another electronic component included in the current detection circuit 60. Further note that the first surface 641 and the second surface 642 of the Peltier element 64 are not limited to a configuration in which they are in direct contact with a target surface, such as, e.g., the operational amplifier 601 and a cover member 63, and may be thermally connected via a heat transfer member, for example.

In this embodiment, the configuration in which the Peltier element 64 is added to board unit 6 of the second embodiment has been described. However, the present invention is not limited to such a configuration and may be configured such that the Peltier element 64 is attached to the board unit 6 of the second embodiment.

5. Modification

In the above-described embodiments, the configuration in which only one cover member 63 is provided has been described. However, in cases where the gas chromatograph 1 is provided with a plurality of boards 61, in cases where a plurality of current detection circuits 60 are mounted on a single board 61, or the like, a plurality of cover members 63 may be provided.

5-1. First Modification

Figure 5A:
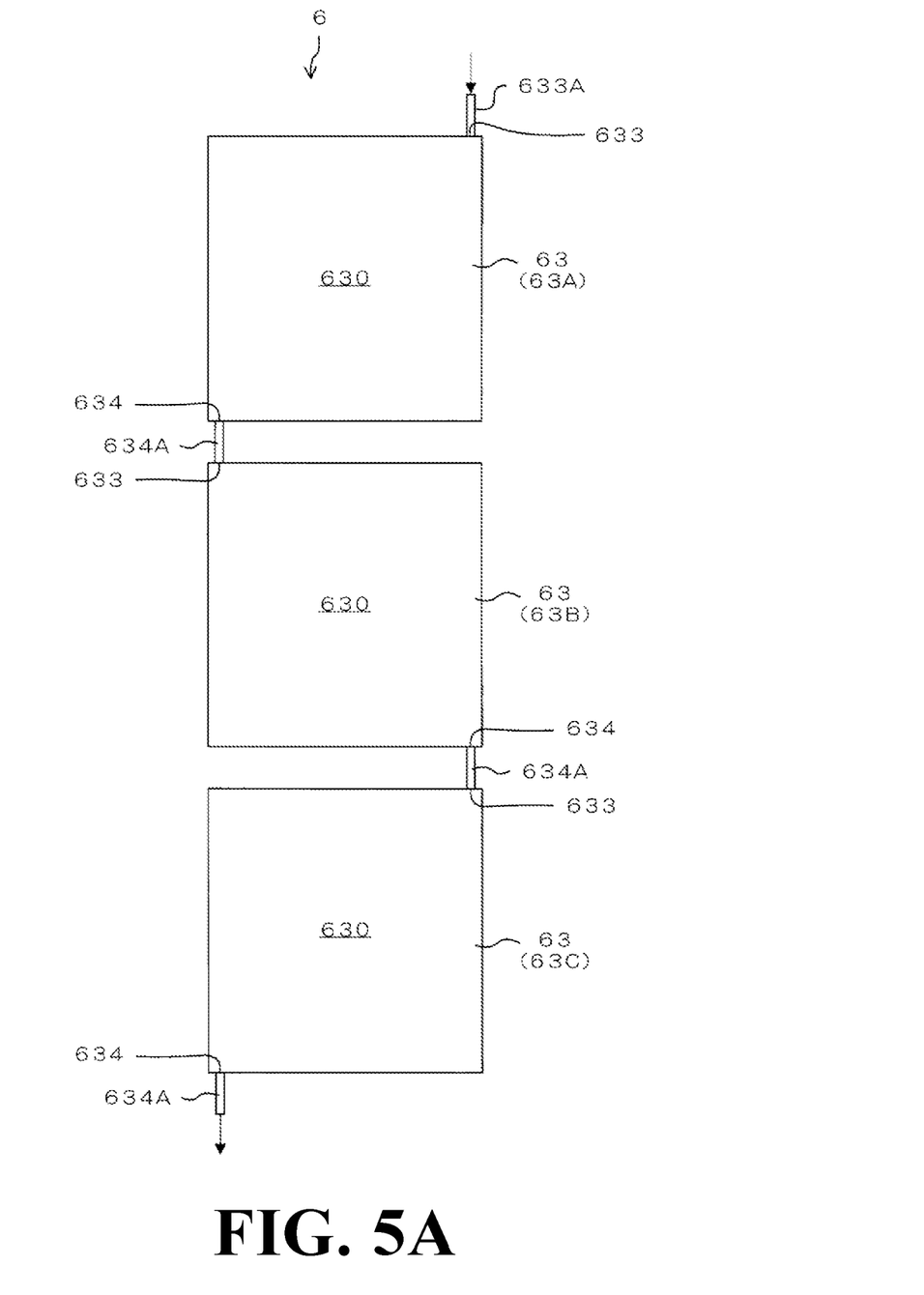
FIG. 5A is a schematic plan view for explaining a first modification of a board unit in which a plurality of cover members is provided.

FIG. 5A is a schematic plan view for explaining a first modification of a board unit 6 in which a plurality of cover members 63 is provided. A space 630 is formed inside each cover member 63, and a current detection circuit 60 is accommodated in each space 630.

In this example, three cover members 63 (first cover member 63A, second cover member 63B, and third cover member 63C) are fluidly connected in series. Specifically, in the first cover member 63A, one end of an inlet tube 633A is attached to an inlet port 633, and one end of an output tube 634A is attached to an outlet port 634. In the second cover member 63B, the other end portion of the output tube 634A in which one end portion is attached to the outlet port 634 of the first cover member 63A is attached, and the one end portion of the output tube 634A is attached to an outlet port 634. In the third cover member 63C, the other end portion of the output tube 634A in which one end portion is attached to an outlet port 634 of the second cover member 63B is attached, and the one end portion of the output tube 634A is attached to an outlet port 634. The other end of the output tube 634A in which one end of which is attached to the outlet port 634 of the third cover member 63C is open to the atmosphere.

Thus, the gas supplied to the inlet port 633 of the first cover member 63A flow from the space 630 in the first cover member 63 to the space 630 in the second cover member 63B and then through the space 630 in the third cover member 63C and out of the outlet port 634 of the third cover member 63C. Note that the number of the cover members 63 is not limited to three, and two or four or more cover members 63 may be fluidly connected in series.

5-2. Second Modification

Figure 5B:
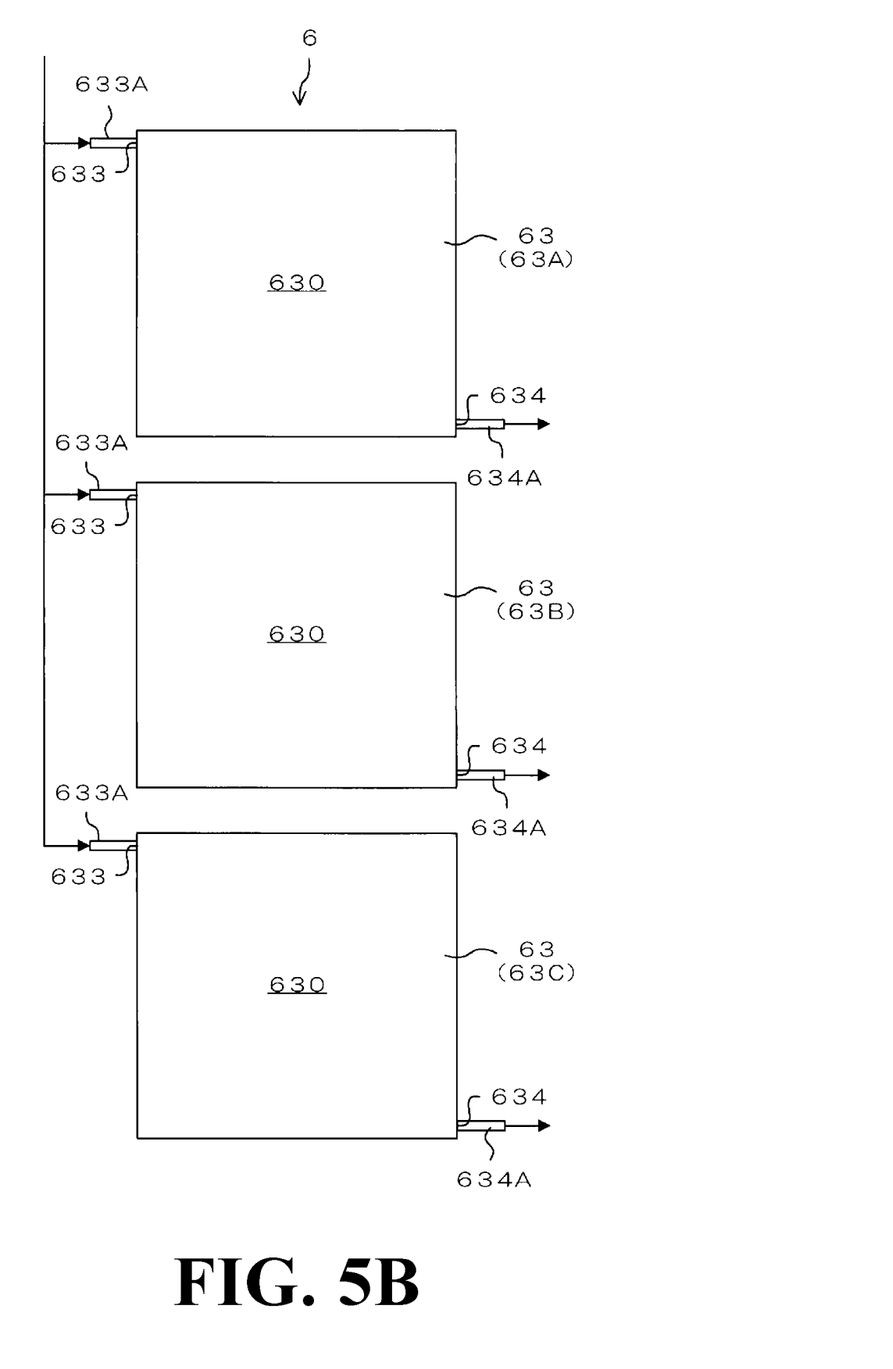
FIG. 5B is a schematic plan view for explaining a second modification of a board unit in which a plurality of cover members is provided.

FIG. 5B is a schematic plan view for explaining a second modification of a board unit 6 in which a plurality of cover members 63 are provided. A space 630 is formed inside each cover member 63, and a current detection circuit 60 is accommodated in each space 630.

In this example, three cover members 63 (first cover member 63A, second cover member 63B, and third cover member 63C) are fluidly connected in parallel. Specifically, in each of the first cover member 63A, the second cover member 63B, and the third cover member 63C, one end portion of the inlet tube 633A is attached to the inlet port 633, and the other end portion of the inlet tube 633A is communicated with the same gas source 2. In each of the first cover member 63A, the second cover member 63B, and the third cover member 63C, one end of the output tube 634A is attached to the outlet port 634, and the other end of the output tube 634A is open to the atmosphere.

A gas from the common gas source 2 is thus supplied individually to each of the spaces 630 of the first cover member 63A, the second cover member 63B, and the third cover member 63C and is flowed out from each outlet port 634. Note that the number of the cover member 63 is not limited to three, and two or four or more cover members 63 may be fluidly connected in parallel.

5-3. Others Modifications

The timing of supplying the gas to the space 630 inside the cover member 63 may be arbitrarily set. For example, it may be configured such that the gas is intermittently supplied into the space 630 at predetermined intervals. Alternatively, it may be configured such that a humidity sensor is be provided in the space 630 and when the humidity in the space 630 detected by the humidity sensor exceeds a predetermined threshold, the gas is supplied into the space 630. Alternatively, it may be configured such that the gas is supplied into the space 630 at the time of starting the gas chromatograph 1 and the flow rate of the gas is lowered when the humidity in the space 630 drops to a predetermined threshold.

The gas supplied to the detector 5 is not limited to a makeup gas and may function as another gas such as a supporting gas. The gas supplied to the detector 5 as the supporting gas may be, for example, dehumidified compressed air (dry air) or hydrogen.

The present invention is not limited to a configuration in which a common gas is supplied to the column 4 and the detector 5 but may be a configuration in which different gases are supplied to the column 4 and the detector 5. In this case, a gas source for supplying a gas to the column 4 and a gas source for supplying a gas to the detector 5 may be provided separately. Alternatively, it may be configured such that a gas is not supplied to the detector 5.

The present invention is not limited to a configuration in which a part of the gas supplied to the column 4 or a part of the gas supplied to the detector 5 is supplied to the board unit 6, but may be a configuration in which a gas source for supplying the gas to the board unit 6 is provided separately.

In the above-described embodiments, the gas chromatograph 1 has been described as an example of an analyzer. Note that, however, the present invention is not limited to be applied to a gas chromatograph 1 and can be applied to other analyzers such as a liquid chromatograph. In the case of a liquid chromatograph, instead of the gas, a carrier fluid may be supplied to the column 4. Further note that, by using a mass spectrometer as a chromatographic detector, a gas chromatograph mass spectrometer or a liquid chromatograph mass spectrometer to which the present invention is applied can be constructed.

In the case of an analyzer such as a FT-IR in which an optical system is provided to measure mid-infrared ray, dry air or dry nitrogen, which is low in moisture, is purged from a gas source into a space through which the optical system or light passes in order to reduce the humidity in the space through which light passes. Further, in cases where an air spring is adopted for a vibration removal table on which the device is placed, a gas source for supplying dry air to the air spring is required. Thus, a gas may be supplied into the cover member 63 from these gas sources.

In a gas chromatograph, a helium gas, a hydrogen gas, a nitrogen gas, an argon gas, or the like are used as a carrier fluid to be introduced into a column. The gas used in the detector differs depending on the type of the detector. In the case of an FID detector (Flame Ionization Detector), for example, a hydrogen gas, a dry air, a helium gas, or a nitrogen gas is used. For example, a hydrogen gas, a dry air, a helium gas, or a nitrogen gas is used in an FTD detector (Flame Thermionic Detector). For example, a hydrogen gas or a dry air is used in an FPD (Frame Photometric Detector). In the case of a TCD detector (Thermal Conductivity Detector), for example, the same gas as a carrier fluid introduced into the column is used. For example, a helium gas or a nitrogen gas is used in a BID detector (Dielectric-Barrier Discharge Ionization Detector). Therefore, these gases may be supplied from a gas source into the cover member 63.

In a liquid chromatograph, degassing is performed using, for example, a helium gas in order to remove the dissolved gas in a solution which is a mobile phase. Therefore, the gas used for degassing may be supplied from a gas source into the cover member 63.

In a mass spectrometer, different gases are used depending on the type thereof. In an ICP (Inductively Coupled Plasma) mass spectrometer, a hydrogen gas, an oxygen gas, or a helium gas, for example, is used in the plasma generator. In an ion mobility mass spectrometer, for example, a nitrogen gas is used as a drift gas or a buffer gas. Therefore, these gases may be supplied from a gas source into the cover member 63.

In a liquid chromatograph mass spectrometer, for example, a nitrogen gas, an argon gas, or a helium gas is used as a nebulizer gas used for ESI (Electrospray Ionization) or a cleaning gas flowed into a chamber. Therefore, these gases may be supplied from a gas source into the cover member 63.

Figure 6A:
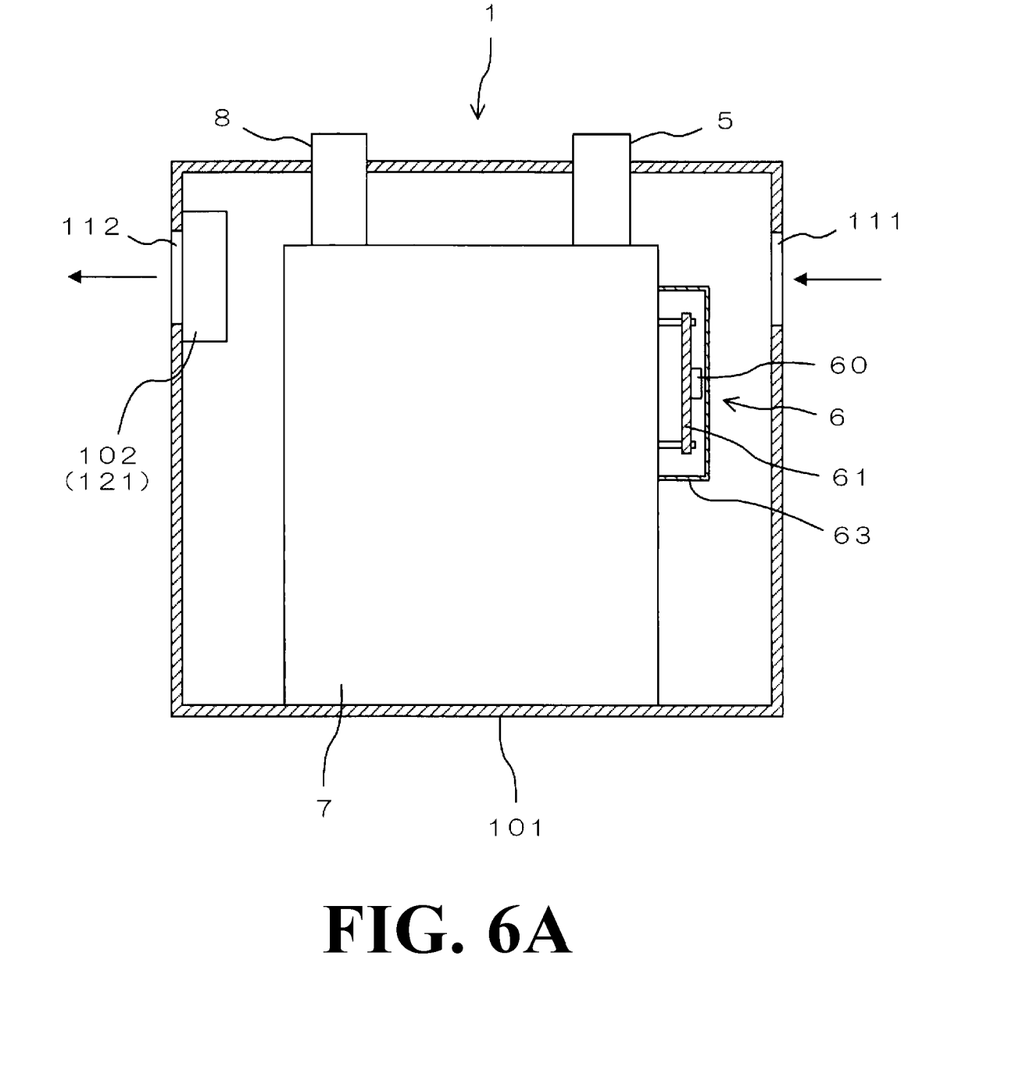
FIG. 6A is a schematic cross-sectional view showing an example of a configuration in a gas chromatograph.

FIG. 6A is a schematic cross-sectional view showing an example of a configuration in a gas chromatograph 1. The gas chromatograph 1 is provided with a hollow-shaped housing 101. A column oven 7 in which a column 4 is accommodated is arranged in the housing 101. The column 4 is heated in the column oven 7. One end of the column 4 is communicated with the sample introduction port 8 and the other end of the column 4 is communicated with the detector 5. The liquid sample vaporized in the sample vaporization chamber in the sample introduction port 8 is introduced into the column 4 together with a carrier gas, and the components in the liquid sample separated in the process of passing through the column 4 are detected by the detector 5.

A board 61 is attached to the exterior of the column oven 7. That is, in this case, the column oven 7 constitutes a base member 62. Thus, the board 61 and the cover member 63 are accommodated in the housing 101. Note that, however, the present invention is not limited to the configuration in which the board 61 is directly attached to the column oven 7, and the board 61 may be attached to the column oven 7 via another base member 62, or the board 61 may be attached to a member other than the column oven 7 provided in the housing 101. In this embodiment, a configuration in which a current detection circuit 60 mounted on the board 61 and the board 61 is covered with the cover member 63 is employed (the configuration of FIG. 2A and FIG. 2B). However, the present invention is not limited to such a configuration and may be a configuration in which the cover member 63 is attached to the board 61 (the configuration of FIG. 3A and the configuration of FIG. 3B), or a configuration in which the Peltier element 64 is provided (the configuration in FIG. 4A and a configuration in FIG. 4B).

An intake port 111 and an exhaust port 112 are formed in the housing 101. The intake port 111 and the exhaust port 112 may be formed in the side surface of the housing 101 as shown in FIG. 6A, or may be formed in another surface such as the top surface or the bottom surface. The intake port 111 and the exhaust port 112 may be formed on opposite side surfaces with the column oven 7 interposed therebetween as shown in FIG. 6A, or may be formed on side surfaces that do not oppose each other.

A fan 102 is attached to the exhaust port 112. This fan 102 is an exhaust fan 121 for exhausting the air in the housing 101. By driving the exhaust fan 121, the air can be taken into the housing 101 from the intake port 111 and the air in the housing 101 can be exhausted from the exhaust port 112. This makes it possible to cool a heat-generating component such as a column oven 7 arranged in the housing 101. The driving of the exhaust fan 121 may be initiated, for example, when the power of the gas chromatograph 1 is turned on.

Figure 6B:
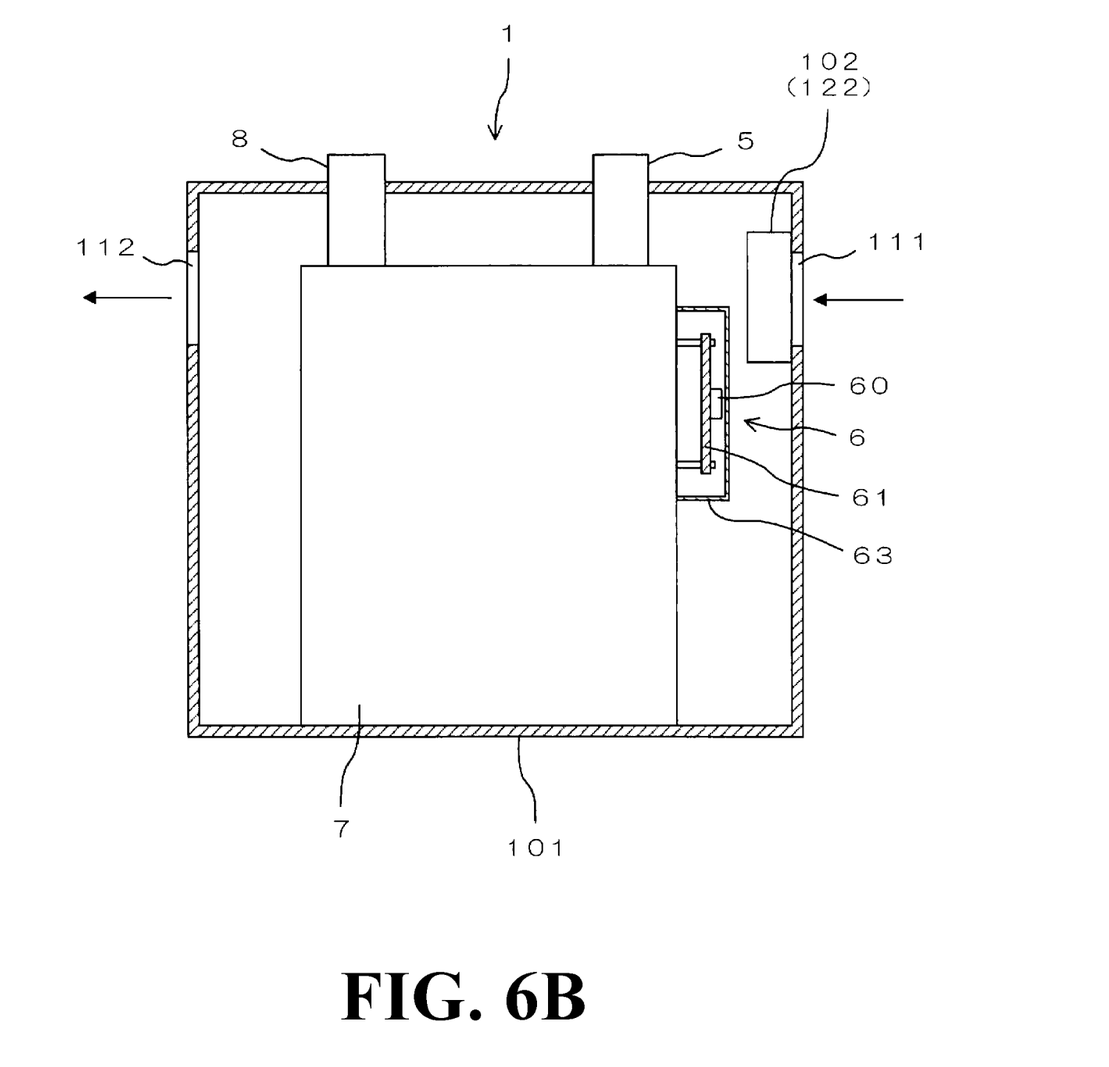
FIG. 6B is a schematic cross-sectional view showing another example of a configuration in a gas chromatograph.

FIG. 6B is a schematic cross-sectional view showing another example of a configuration in a gas chromatograph 1. In this embodiment, the configuration differs from the configuration of FIG. 6A in that as the fan 102 for taking in air into the housing 101, an intake fan 122 is provided instead of the exhaust fan 121. Since the rest of the configuration is the same as that of FIG. 6A, the same reference numeral is allotted to the same component in the figures, and the detailed descriptions thereof are omitted.

In the illustrated FIG. 6B, the fan 102 is attached to the intake port 111. This fan 102 is an intake fan 122 for drawing the outside air into the housing 101. By driving the intake fan 122, air can be taken into the housing 101 from the intake port 111 and the air in the housing 101 can be exhausted from the exhaust port 112. With this, in the same manner as in the case shown in FIG. 6A, this makes it possible to cool components which generate heat, such as the column oven 7, arranged in the housing 101. The driving of the intake fan 122 may be initiated, for example, when the power of the gas chromatograph 1 is turned on.

6. Aspects

It will be understood by those skilled in the art that the plurality of exemplary embodiments described above is illustrative of the following aspects.

(Item 1)

An analyzer according to one aspect of the present invention may be configured such that the analyzer includes:
 a detector configured to detect components in a sample;
 a board on which a current detection circuit for processing an output signal from the detector is mounted;
 a cover member having a space in which a current detection circuit is accommodated; and
 a gas source configured to supply a gas to the space, wherein the cover member is provided with an inlet port for introducing the gas from the gas source into the space and an outlet port for allowing the gas in the space to flow out.

According to the analyzer as recited in Item 1, the gas from the gas source is supplied into the space accommodating the current detection circuit. The gas is introduced into the space from the inlet port formed in the cover member, passes through the space, and is then flowed out from the outlet port formed in the cover member. As a result, the humidity in the space can be reduced, so that the generation of noise in the current detection circuit can be suppressed.

(Item 2)

In the analyzer as recited in the above-described Item 1, the analyzer may further include:
 a column to which a sample is supplied together with a carrier fluid,
 wherein the gas source is configured to supply the gas as the carrier fluid to the column.

According to the analyzer recited in the above-described Item 2, the gas supplied to the column can be used to supply the gas into the space in which the current detection circuit is accommodated, thereby reducing the humidity in the space. Therefore, there is no need to separately provide a gas source in order to reduce the humidity in the space.

(Item 3)

In the analyzer as recited in the above-described Item 1, the gas source may be configured to supply the gas to the detector, According to the analyzer as recited in the above-described Item 3, the gas supplied to the detector can be used to supply the gas into the space in which the current detection circuit is accommodated, thereby reducing the humidity in the space. Therefore, there is no need to separately provide a gas source in order to reduce the humidity in the space.

(Item 4)

The analyzer as recited in any one of the above-described Items 1 to 3, the analyzer may further include:
 a base member configured to hold the board,
 wherein the cover member is attached to the base member to cover the board and the current detection circuit mounted on the board.

According to the present analyzer as recited in the above-described Item 4, by covering the entire board with the cover member attached to the base member, the humidity of the current detection circuit mounted on the board can be reduced by the gas supplied to the space in the cover member.

(Item 5)

The analyzer as recited in any one of the above-described Items 1 to 3,
 the cover member may be attached to the board to cover the current detection circuit.

According to the analyzer as recited in the above-described Item 5, by covering the current detection circuit mounted on the board with the cover member attached to the board, the humidity of the current detection circuit mounted on the board can be reduced by the gas supplied to the space in the cover member. Compared to a structure in which the entire board is covered with the cover member, it is expected that a hole for passing a wire electrically connected to the board need not be provided in the cover member. In addition, the volume in the cover member can be reduced, and the use of the gas can be reduced.

(Item 6)

In the analyzer as recited in any one of the above-described Items 1 to 5, the analyzer may further include:
 a Peltier element provided in the space to cool an electronic component included in the current detection circuit.

According to the analyzer described in the above-described Item 6, the generation of noise in the current detection circuit can be suppressed by cooling the electronic component included in the current detection circuit using the Peltier element. Since the humidity in the space accommodating the current detection circuit is lowered, it is possible to suppress the occurrence of dew condensation by the cooling electronic component.

(Item 7)

In the analyzer as recited in any one of the above-described Items 1 to 6, the gas may be an inert gas.

According to the analyzer described in the above-described Item 7, it is possible to suppress the occurrence of oxidization or erosion of each part of the current detection circuit due to the gas supplied into the space accommodating the current detection circuit.

(Item 8)

In the analyzer as recited in any one of the above-described Items 1 to 7, the analyzer may further include:
 a housing in which the board and the cover member are accommodated; and
 a fan configured to take air into the housing.

According to the analyzer as recited in the above-described Item 8, by driving the fan, the outside air is taken into the housing in which the board and the cover member are accommodated. The ambient air may include, for example, water, fine debris, products from the evaporation of sample, or analytically released reactants. If the sea is near, chloride may be contained in the outside air. In some analytical laboratories, organic matters such as alcohol may be contained in the outside air. In addition, in the case of a high-temperature device such as a gas chromatograph, siloxanes generated in the device may be contained in the outside air. When these contaminants adhere to the board surface, the electronic components, or the like, the insulating is lowered and the leakage current is increased, which is problematic in the current detection circuit of detecting a minute current. Even with such a fan, according to the above-described analyzer, since the gas from the gas source is supplied into the space accommodating the current detection circuit, the inside of the space is purged. Therefore, since contaminants in the outside air taken into the housing by driving the fan hardly enter the space, it is possible to suppress contamination of board surfaces and electronic components.

The invention claimed is:

1. An analyzer comprising:
 a detector configured to detect components in a sample;
 a board unit including:
 a board on which a current detection circuit for processing an output signal from the detector is mounted, and
 a cover member defining a space in which a current detection circuit is accommodated; and
 a gas source configured to supply a gas to the space defined by the cover member,
 wherein the cover member is provided with an inlet port fluidly connected to the gas source and an outlet port for allowing the gas in the space to flow out.

2. The analyzer as recited in claim 1, further comprising:
 a column to which the sample is supplied together with a carrier fluid,
 wherein the gas source is configured to supply the gas as the carrier fluid to the column.

3. The analyzer as recited in claim 1,
wherein the gas source is configured to supply the gas to the detector.

4. The analyzer as recited in claim 1, further comprising:
a base member configured to hold the board,
wherein the cover member is attached to the base member to cover the board and the current detection circuit mounted on the board.

5. The analyzer as recited in claim 1,
wherein the cover member is attached to the board to cover the current detection circuit.

6. The analyzer as recited in claim 1, further comprising:
a Peltier element provided in the space to cool an electronic component included in the current detection circuit.

7. The analyzer as recited in claim 1,
wherein the gas is an inert gas.

8. The analyzer as recited in claim 1, further comprising:
a housing in which the board and the cover member are accommodated; and
a fan configured to take air into the housing.

* * * * *